(12) United States Patent
Huang

(10) Patent No.: US 8,384,308 B2
(45) Date of Patent: Feb. 26, 2013

(54) DRIVE CIRCUIT FOR LEDS

(75) Inventor: Li-Hsiang Huang, Taipei (TW)

(73) Assignee: Edison Opto Corporation, New Taipei (TW)

( * ) Notice: Subject to any disclaimer, the term of this patent is extended or adjusted under 35 U.S.C. 154(b) by 217 days.

(21) Appl. No.: 12/868,749

(22) Filed: Aug. 26, 2010

(65) Prior Publication Data

US 2012/0049763 A1 Mar. 1, 2012

(51) Int. Cl.
*H05B 37/02* (2006.01)
(52) U.S. Cl. ........................................................ 315/307
(58) Field of Classification Search .................. None
See application file for complete search history.

(56) References Cited

U.S. PATENT DOCUMENTS

| | | | | |
|---|---|---|---|---|
| 6,021,736 | A * | 2/2000 | Ciaramita | 118/13 |
| 6,577,072 | B2 * | 6/2003 | Saito et al. | 315/185 R |
| 7,804,256 | B2 * | 9/2010 | Melanson | 315/291 |
| 2009/0295292 | A1 * | 12/2009 | Harmgardt et al. | 315/51 |
| 2010/0231136 | A1 * | 9/2010 | Reisenauer et al. | 315/276 |
| 2010/0237786 | A1 * | 9/2010 | Santo et al. | 315/185 R |

* cited by examiner

*Primary Examiner* — Crystal L Hammond
(74) *Attorney, Agent, or Firm* — CKC & Partners Co., Ltd.

(57) ABSTRACT

This present invention provides a drive circuit to drive LEDs. The drive circuit comprises a transistor and a voltage regulator. The transistor is connected to the LEDs in series. The voltage regulator receives a first voltage to generate a second voltage to control the gate electrode of the transistor. The second voltage can turn on the transistor and ensure this transistor operated in saturation mode to generate a drive current to drive the LEDs.

9 Claims, 3 Drawing Sheets

DRIVE CIRCUIT FOR LEDS

BACKGROUND

1. Field of Invention

The present invention relates to a drive circuit. More particularly, the present invention relates to a drive circuit for driving light emitting diodes (LEDs).

2. Description of Related Art

The most important issues in today are about energy saving and carbon emission reduction and the Greenhouse effect. A traditional bulb generates 0.683 Kg of $CO_2$ emissions when one kilowatt-hour of electrical power is consumed by this bulb. Typically, 525 kilowatt-hours of electrical power are consumed by a bulb in one year, which will generate more carbon and increase the Greenhouse effect. Therefore, the trend today is to replace the bulbs with light emitting diodes.

A light-emitting diode (LED) is a semiconductor light source. When a light-emitting diode is forward biased (switched on), electrons are able to recombine with holes within the device, releasing energy in the form of photons. This effect is called electroluminescence and the color of the light (corresponding to the energy of the photon) is determined by the energy gap of the semiconductor. An LED is usually small in area (less than 1 $mm^2$), and integrated optical components shape its radiation pattern and assist in reflection. LEDs present many advantages over incandescent light sources including lower energy consumption, longer lifetime, improved robustness, smaller size, faster switching, and greater durability and reliability. Light-emitting diodes are used in applications as diverse as replacements for aviation lighting, automotive lighting (particularly indicators) and in traffic signals. The current flows through LED determine its brightness.

FIG. 1 illustrates a typical drive circuit for a LED. As shown in the FIG. 1, a voltage source 100 provides a current I to the LEDs 104, 106, 107, 108 through the resistor 102. If the resistance of the resistor 102 is R and the resistance of each LED 104, 106, . . . , 108 is RD, the current I flowing through LEDs 104, 106, . . . , 108 will be $$I = \frac{V}{R + n \times R_n}.$$

However, the typical drive circuit can not supply a fixed output current. That is, the current I is changeable based on the temperature. The increasing temperature of the LEDs 104, 106, . . . , 108 will increase the current I even though a fixed voltage is supplied to the LEDs 104, 106, . . . , 108. For example, when a LED is powered for a long time, the temperature of this LED increases. Then, the increasing temperature will change the current I following through the LEDs 104, 106, . . . , 108 even though the voltage supplied to the LEDs 104, 106, . . . , 108 is not changed. In other words, the brightness of the LEDs 104, 106, . . . , 108 will be changed based on the temperature. On the other hand, when a voltage supplied to the typical drive circuit is changed, the output current is also changed in the typical drive circuit. Accordingly, the typical drive circuit can not supply a stable output current to the LEDs to illuminate a stable brightness, which limits the development of the LEDs used in a light system.

Therefore, a drive circuit that can supply a stable output current to the LEDs is needed.

SUMMARY

This present invention provides a drive circuit that can supply a stable output current to drive LEDs. The output current of the drive circuit is not changed based on the temperature of the LEDs. Therefore, a stable brightness of the LEDs can be realized.

This present invention provides a drive circuit to drive LEDs. The drive circuit comprises a transistor and a voltage regulator. The transistor is connected to the LEDs in series. The voltage regulator receives a first voltage to generate a second voltage to control the gate electrode of the transistor. The second voltage can turn on the transistor and ensure this transistor operated in saturation mode to generate a drive current to drive the LEDs.

In an embodiment, the drive circuit further includes a rectifier circuit connected to a voltage source to rectify an output voltage from the voltage source to a third voltage.

In an embodiment, the drive circuit further includes a divider circuit connected to the rectifier circuit to divide the third voltage to the first voltage.

In an embodiment, the rectifier circuit is a bridge rectifier circuit. The regulator is a switching regulator or a liner regulator.

In an embodiment, the drive circuit further includes a resistor connected to a source electrode of the transistor.

This present invention provides a drive circuit to drive LEDs. The drive circuit comprises a rectifier circuit, a divider circuit, a regulator, a transistor and a resistor. The rectifier circuit is connected to a voltage source to rectify an output voltage from the voltage source to a first voltage. The divider circuit is connected to the rectifier circuit to divide the first voltage to a second voltage. The regulator receives the second voltage to generate a third voltage. The transistor is connected to the LEDs in series. The third voltage controls the gate electrode of the transistor. The third voltage can turn on the transistor and ensure this transistor operated in saturation mode to generate a drive current to in drive the LEDs. The resistor connected to a source electrode of the transistor.

In an embodiment, the rectifier circuit is a bridge rectifier circuit. The regulator is a switching regulator or a liner regulator.

Accordingly, the LEDs are connected to a MOS transistor in series. A regulator supplied a stable voltage to a gate electrode of the MOS transistor to turn on the MOS transistor and ensure this MOS transistor operated in saturation mode to generate a stable drive current to drive the LEDs. Because the voltage supplied by the regulator to the gate electrode of the MOS transistor is fixed, the current following through these LEDs is fixed even though the temperature of these LEDs changes or the voltage supplied to the LEDs changes. This drive circuit only needs a regulator and a MOS transistor to generate a stable drive circuit to the LEDs. Therefore, the cost is low.

BRIEF DESCRIPTION OF THE DRAWINGS

The invention can be more fully understood by reading the following detailed description of the embodiments, with reference made to the accompanying drawings as follows.

DETAILED DESCRIPTION

A light-emitting diode (LED) is a semiconductor light source. When a light-emitting diode is forward biased (switched on), electrons are able to recombine with holes within the device, releasing energy in the form of photons.

This effect is called electroluminescence and the color of the light is determined is by the energy gap of the semiconductor. LEDs present many advantages over incandescent light sources including lower energy consumption, longer lifetime, improved robustness, smaller size, faster switching, and greater durability and reliability.

A MOS transistor has the following characteristic. When a MOS transistor is operated in a saturation mode, the drain current is only related to the voltage supplied to the gate electrode of the MOS transistor. That is, when a MOS transistor is operated in a saturation mode and a fixed voltage is supplied to the gate electrode of the MOS transistor, the drain current can maintain a fixed value even though the voltage supplied to the drain electrode of the MOS transistor is changed. Accordingly, the present invention utilizes this characteristic of the MOS transistor to generate a stable drive current to drive LEDs. Because of the drive current is only related to the voltage supplied to the gate electrode of the MOS transistor, the change of the temperature of LEDs or the voltage supplied to the LEDs can not change the drive current. A stable brightness of the LEDs can be realized.

It is noticed that a regulator is adapted in the following embodiment to generate a fixed voltage to supply to the gate electrode of the MOS transistor. However, in other embodiments, the devices that can generate fixed voltage also can be adapted in this drive circuit to supply voltage to the gate electrode of the MOS transistor of the present invention.

Figure 1:
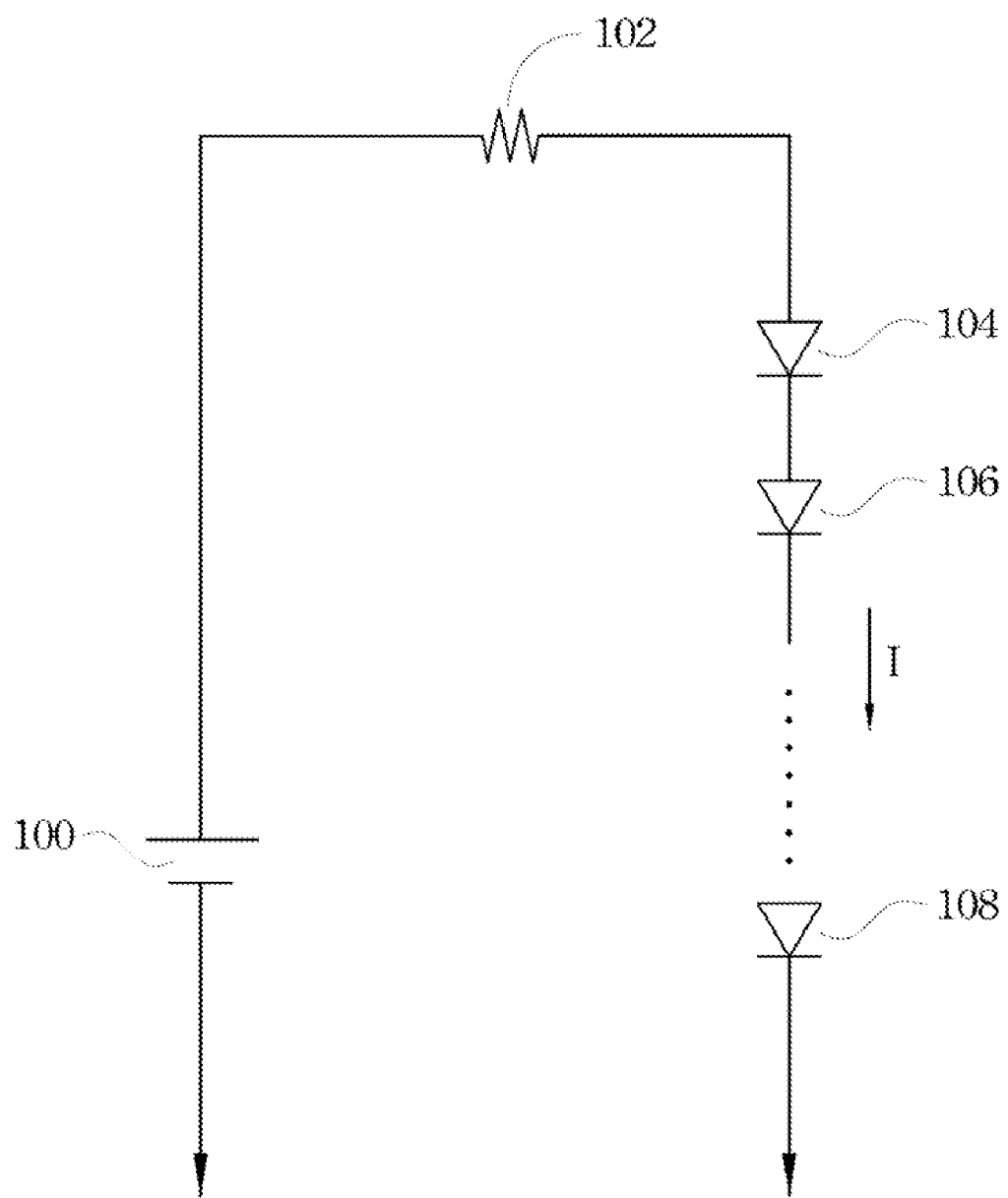
FIG. 1 illustrates a typical drive circuit.
Figure 2:
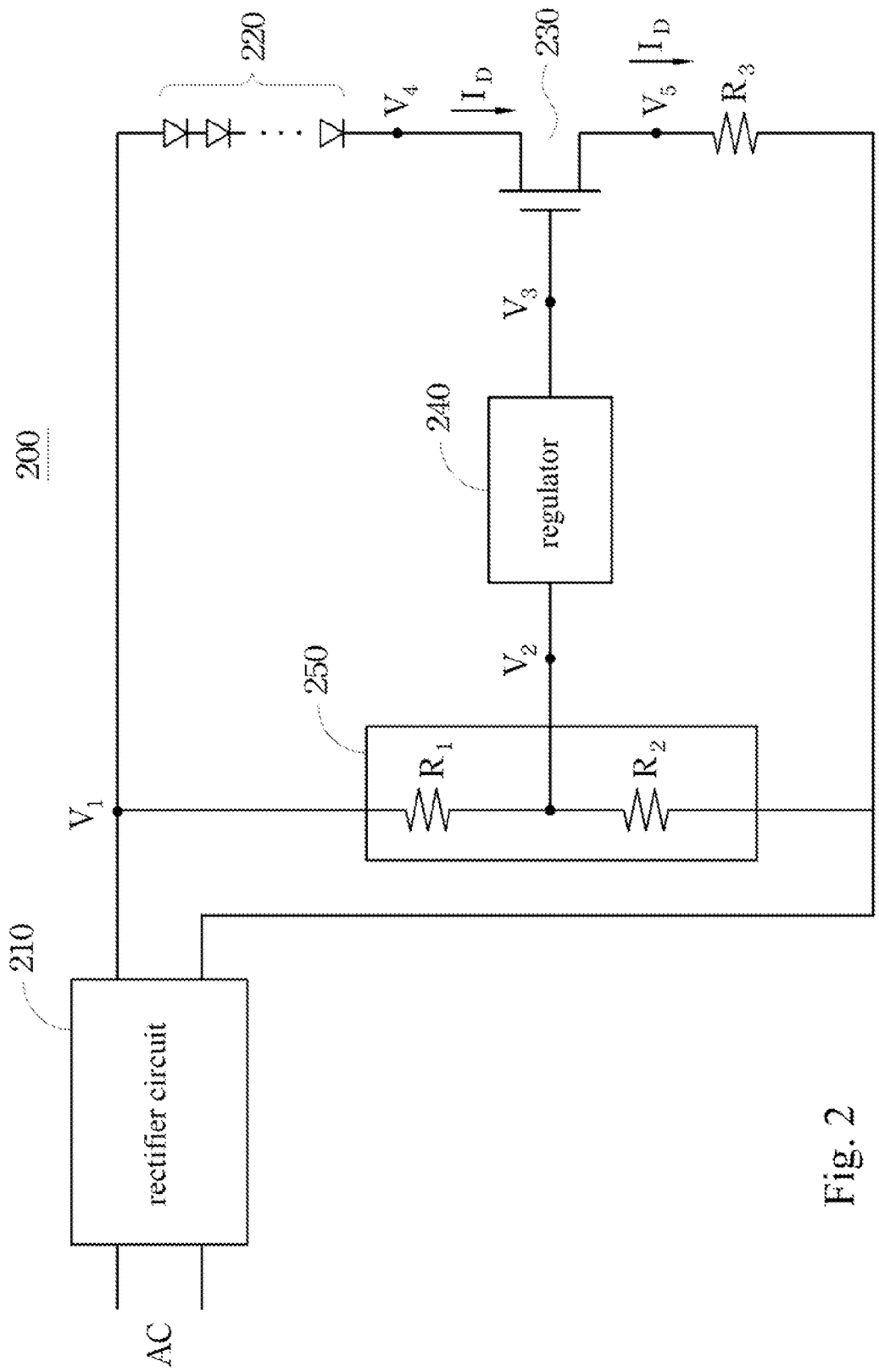
FIG. 2 illustrates a schematic diagram of a drive circuit according to an embodiment of the present invention.

FIG. 2 illustrates a schematic diagram of a drive circuit according to an embodiment of the present invention. The drive circuit 200 comprises a rectifier circuit 210, a plurality of LEDs 220, a MOS transistor 230 and a regulator 240. These LEDs are connected together in series.

The rectifier circuit 210 receives AC power to generate a DC voltage V1. The voltage V1 is sent to a divider circuit 250 to generate a voltage V2. The voltage V2 is supplied to the regulator 240. The regulator 240 transforms the voltage V2 to a stable voltage V3. The voltage V3 is supplied to the gate electrode of the MOS transistor 230. The voltage V3 can turn on the MOS transistor 230 and ensure this MOS transistor 230 operated in saturation mode. The voltage difference between the voltage V3 and the voltage V5 should be larger than a threshold voltage Vt of the MOS transistor 230. When the MOS transistor 230 is operated in a saturation mode, the current following through the MOS transistor 230 is only related to the voltage supplied to the gate electrode of the MOS transistor 230. The following equation describes the relationship between the current following through the MOS transistor 230 and the voltage supplied to the gate electrode.

$$I_D = K(V_{GS} - V_t)^2$$

In other words, when a fixed voltage V3 is supplied to the gate electrode of the MOS transistor 230, the drain current $I_D$ can maintain a fixed value even though the voltage V4 supplied to the drain electrode of the MOS transistor is changed. Therefore, a stable current $I_D$ can follow through the LEDs 220 to drive the LEDs 220.

The resistor R3 connected to the source electrode of the MOS transistor 230 has a negative feedback function to maintain the current $I_D$. For example, when the current $I_D$ is increased, the voltage V5 supplied to the source electrode of the MOS transistor 230 is increased too to cause the voltage difference between the voltage V3 and the voltage V5 is reduced. Based on the equation (1), the current $I_D$ is reduced. That is, the increased current $I_D$ is dropped by the resistor R3. Therefore, a stable current $I_D$ is realized. Moreover, the value of the current $I_D$ can be changed by changing the resistance of the resistor R3. Therefore, the brightness of the LEDs is changed. For example, the value of the current $I_D$ is increased by reducing the resistance of the resistor R3. Then, the increased current $I_D$ increases the brightness of the LEDs 220. On the other hand, the value of the current $I_D$ is reduced by increasing the resistance of the resistor R3. Then, the reduced current $I_D$ reduces the brightness of the LEDs 220.

On the other hand, the changed voltage of the AC power, for example, the voltage of the AC power is increased from 100 volt to 110 volt or reduced from 100 volt to 90 volt, can not affect the current $I_D$ following through the LEDs 220. Because the voltage V3 supplied by the regulator 240 is not changed, the MOS transistor 230 is still operated in the saturation mode. That is, the current $I_D$ following through the MOS transistor 230 is not related to the voltage supplied to the drain/source electrode of the MOS transistor 230. The current $I_D$ following through the MOS transistor 230 is only related to the voltage supplied to the gate electrode of the MOS transistor 230. The changed voltage of the AC power only changes the voltage V4 and the voltage V5. That is, the changed voltage of the AC power only changes the voltage supplied to the drain/source electrode of the MOS transistor 230. Therefore, the current $I_D$ following through the LEDs is maintained.

In an embodiment, the drive circuit 200 of the present invention is driven by an AC power. A rectifier circuit 210 transforms the AC power to DC power. The rectifier circuit 210 is half-wave rectifier or a full-wave rectifier. A full-wave rectifier, such as a bridge rectifier circuit, is adapted in this embodiment to transform the AC power to a DC power.

Figure 3:
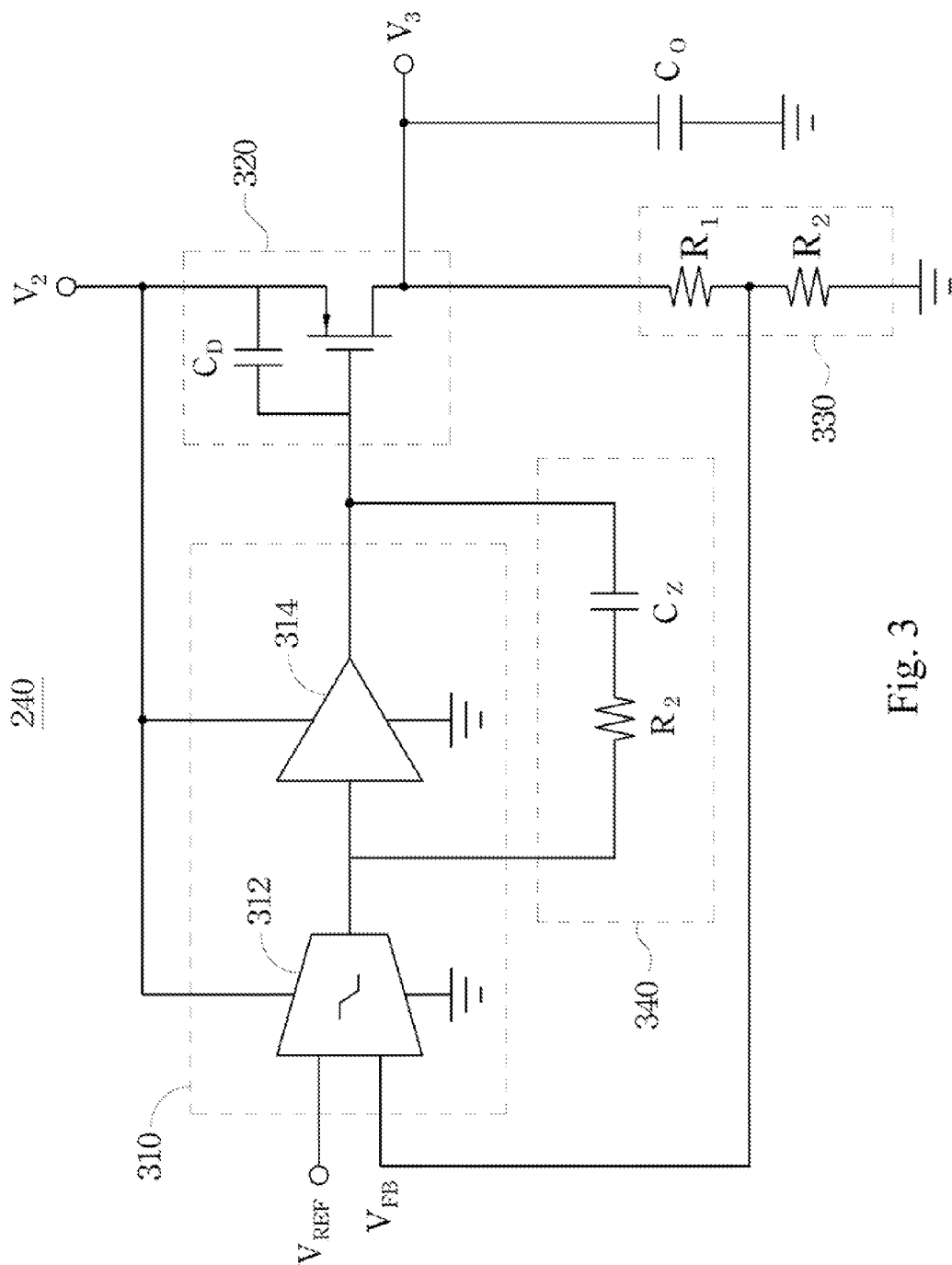
FIG. 3 is a schematic diagram of a regulator.

The regulator 240 is a switching regulator or a liner regulator. A liner regulator, such as a low dropout regulator (LDO regulator), is usually adapted to reduce the voltage. In an embodiment, the regulator 240 in the drive circuit 200 of the present invention is a LDO regulator. FIG. 3 is a schematic diagram of the regulator. Referring to FIG. 2 and FIG. 3, the regulator 240 includes an error amplifier 310, a power switch 320, a divider circuit 330 and a compensate circuit 340 and a capacitor Co. The voltage V2 is transformed to voltage V3 by the regulator 240 to drive the MOS transistor 230. The divider 330 includes two resistors R1 and R2. The divider 330 divides the voltage V3 and generates a feedback voltage $V_{FB}$. The error amplifier 310 includes a comparator 312 and an amplifier 314. The comparator 312 compares the feedback voltage $V_{FB}$ with a reference voltage $V_{REF}$ to generate a control signal. The amplifier 314 enhances the control signal to control the power switch 320 to stable voltage V3. The capacitor Co improves the transient response of voltage V3. The compensate circuit 340 includes a resistor Rz and a capacitor CZ connected in series. One end of the compensate circuit 340 is connected to the power switch 320 and the other end of the compensate circuit 340 is connected to the error amplifier 310 to compensate the frequency.

Accordingly, the LEDs are connected to a MOS transistor in series. A regulator supplied a stable voltage to a gate electrode of the MOS transistor to turn on the MOS transistor and ensure this MOS transistor operated in saturation mode to generate a stable drive current to drive the LEDs. Because when a MOS transistor is operated in a saturation mode, the drain current is only related to the voltage supplied to the gate electrode of the MOS transistor. Because the voltage supplied by the regulator to the gate electrode of the MOS transistor is fixed, the current following through these LEDs is fixed even though the temperature of these LEDs changes or the voltage supplied to the LEDs changes. That is, a stable current is supplied to the LEDs to drive the LEDs. This drive circuit only needs a regulator and a MOS transistor to generate a stable drive circuit to the LEDs. Therefore, the cost is low.

Although the present invention has been described in considerable detail with reference to certain embodiments thereof, other embodiments are possible. Therefore, it will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A drive circuit to drive a LED, wherein the drive circuit comprises:
    a transistor connected to the LED in series; and
    a voltage regulator receiving a first voltage to generate a second voltage to control a gate electrode of the transistor, wherein the second voltage turns on the transistor and makes the transistor operate in a saturation mode to generate a drive current to drive the LED.

2. The drive circuit of claim 1, further comprising a rectifier circuit connected to a voltage source to rectify an output voltage of the voltage source to a third voltage.

3. The drive circuit of claim 2, further comprising a divider circuit connected to the rectifier circuit to divide the third voltage to the first voltage.

4. The drive circuit of claim 2, wherein the rectifier circuit is a bridge rectifier circuit.

5. The drive circuit of claim 1, wherein the regulator is a switching regulator or a liner regulator.

6. The drive circuit of claim 1, further comprising a resistor connected to a source electrode of the transistor.

7. A drive circuit to drive a LED, wherein the drive circuit comprises:
    a rectifier circuit connected to a voltage source, wherein the rectifier circuit rectifies an output voltage of the voltage source to a first voltage, the first voltage is sent to the LED;
    a divider circuit connected to the rectifier circuit to divide the first voltage to a second voltage;
    a regulator receives the second voltage to generate a third voltage;
    a transistor connected to the LED in series, wherein the third voltage controls a gate electrode of the transistor, the third voltage turns on the transistor and make the transistor operate in a saturation mode to generate a drive current to drive the LED; and
    a resistor connected to a source electrode of the transistor.

8. The drive circuit of claim 7, wherein the rectifier circuit is a bridge rectifier circuit.

9. The drive circuit of claim 7, wherein the regulator is a switching regulator or a liner regulator.

* * * * *